United States Patent
De Mango et al.

(10) Patent No.: US 9,631,835 B2
(45) Date of Patent: Apr. 25, 2017

(54) ELECTRIC HEATING DEVICE FOR THE PRODUCTION OF HOT WATER AND/OR STEAM

(71) Applicant: LUIGI LAVAZZA S.p.A., Turin (IT)

(72) Inventors: Carlo De Mango, Turin (IT); Paolo Aprile, Monta' d'Alba (IT); Andrea Pinna, Cigliano (IT)

(73) Assignee: LUIGI LAVAZZA S.P.A., Turin (IT)

( * ) Notice: Subject to any disclaimer, the term of this patent is extended or adjusted under 35 U.S.C. 154(b) by 194 days.

(21) Appl. No.: 14/401,580

(22) PCT Filed: May 24, 2013

(86) PCT No.: PCT/IB2013/054292
§ 371 (c)(1),
(2) Date: Nov. 17, 2014

(87) PCT Pub. No.: WO2013/175433
PCT Pub. Date: Nov. 28, 2013

(65) Prior Publication Data
US 2015/0104161 A1    Apr. 16, 2015

(30) Foreign Application Priority Data

May 24, 2012   (IT) .............................. TO2012A0451

(51) Int. Cl.
*F24H 1/10*    (2006.01)
*A47J 31/54*   (2006.01)

(52) U.S. Cl.
CPC ............ *F24H 1/102* (2013.01); *A47J 31/542* (2013.01)

(58) Field of Classification Search
None
See application file for complete search history.

(56) References Cited

U.S. PATENT DOCUMENTS

| | | | |
|---|---|---|---|
| 941,215 A | * | 11/1909 | Wade ...................... F24H 1/121 122/4 A |
| 1,820,458 A | * | 8/1931 | Jenkins ................... F24H 1/121 392/481 |

(Continued)

FOREIGN PATENT DOCUMENTS

| EP | 2 342 998 A1 | 7/2011 |
|---|---|---|
| WO | 2009/156190 A1 | 12/2009 |
| WO | 2011/144733 A2 | 11/2011 |

OTHER PUBLICATIONS

Written Opinion of the International Searching Authority of PCT/IB2013/054292 dated Aug. 2, 2013.

(Continued)

*Primary Examiner* — Thor Campbell
(74) *Attorney, Agent, or Firm* — Sughrue Mion, PLLC (57) ABSTRACT

A heating device (1) which includes: an assembly (2-4) made of a heat-conducting material and has a heating resistor (5) and has a defined passage (7a, 7b) close to the resistor (5), for a flow of water to be heated. The assembly (2-4) includes a central body (2) having two main opposite surfaces (2a, 2b) to which respective closing shells (3, 4) are connected in a liquid-tight manner. Between each main surface (2a, 2b) and the associated shell (3, 4) there is defined a passage following a serpentine path (7a, 7b). The serpentine passages (7a, 7b) communicate with each other by a through-hole (10) provided between the main surfaces (2a, 2b) of the central body (2). The heating resistor (5) is provided in the central body (2), between the main surfaces or faces (2a, 2b) such that it is in a heat-exchanging relationship with both the serpentine passages (7a, 7b).

8 Claims, 6 Drawing Sheets

(56) References Cited

U.S. PATENT DOCUMENTS

| | | | | |
|---|---|---|---|---|
| 1,978,690 | A * | 10/1934 | Peterson | F24H 1/102 392/461 |
| 2,419,429 | A * | 4/1947 | Voiles | F24H 1/103 392/486 |
| 3,782,456 | A * | 1/1974 | Gusmer | F28D 7/0041 165/164 |
| 4,177,375 | A * | 12/1979 | Meixner | H05B 3/141 219/439 |
| 4,255,646 | A * | 3/1981 | Dragoy | F17C 7/04 137/341 |
| 4,334,141 | A * | 6/1982 | Roller | A47J 31/545 219/505 |
| 4,343,988 | A * | 8/1982 | Roller | A47J 31/545 165/165 |
| 4,371,777 | A * | 2/1983 | Roller | H05B 3/14 219/505 |
| 4,508,957 | A * | 4/1985 | Rocchitelli | B60S 1/481 137/341 |
| 4,687,907 | A * | 8/1987 | Barkley | B23K 3/047 228/234.1 |
| 5,724,478 | A * | 3/1998 | Thweatt | F24H 1/142 219/535 |
| 6,330,395 | B1 * | 12/2001 | Wu | F24H 1/14 392/484 |
| 6,912,357 | B2 * | 6/2005 | Bissonnette | B05B 1/24 137/341 |
| 7,046,922 | B1 * | 5/2006 | Sturm | F24H 9/2028 392/465 |
| 7,088,915 | B1 * | 8/2006 | Sturm | F24H 9/2028 392/465 |
| 7,106,957 | B2 * | 9/2006 | Abras | F24H 1/162 392/465 |
| 7,190,893 | B2 * | 3/2007 | Kuebler | B60S 1/488 392/485 |
| 7,760,993 | B2 * | 7/2010 | You | D06F 39/008 392/324 |
| 7,796,868 | B2 * | 9/2010 | Kaastra | F24H 1/121 392/465 |
| 8,170,406 | B2 * | 5/2012 | Wu | B60S 1/487 392/465 |
| 8,561,917 | B2 * | 10/2013 | Arkasjevski | B05B 9/002 239/128 |
| 8,607,694 | B2 * | 12/2013 | Blanc | A47J 31/54 392/479 |
| 8,917,981 | B2 * | 12/2014 | Trebouet | B60S 1/487 392/465 |
| 8,938,845 | B2 * | 1/2015 | Grandjean | B60S 1/488 15/250.01 |
| 2011/0174160 | A1 | 7/2011 | Blanc et al. | |

OTHER PUBLICATIONS

International Search Report of PCT/IB2013/054292 dated Aug. 2, 2013.

* cited by examiner

ELECTRIC HEATING DEVICE FOR THE PRODUCTION OF HOT WATER AND/OR STEAM

CROSS REFERENCE TO RELATED APPLICATIONS

This is a National Stage of International Application No. PCT/IB2013/054292 filed May 24, 2013, claiming priority based on Italian Patent Application No. TO2012A000451 filed May 24, 2012, the contents of all of which are incorporated herein by reference in their entirety.

The present invention relates to en electric heating device for the production of hot water and/or steam.

More specifically the invention relates to an electric heating device of the type comprising an assembly which is made of heat-conducting material and has at least one associated heating resistor and in which, between an inlet orifice and an outlet orifice, there is defined a passage which follows a predetermined path, close to said resistor, for a flow of water intended to be heated and/or converted at least in part into steam.

Such electric heating devices are used in a vast range of apparatus, for example in machines for the preparation of hot beverages, for domestic or professional use, as well as in apparatus of the industrial type.

In the known devices, the passage for the flow of water is normally formed in a die-cast aluminium block and is operationally in a heat-exchanging relationship with the heating resistor. In the case where the heated water is intended for alimentary use, in order to prevent toxic compounds from forming as a result of oxidisation, the surfaces of the aluminium block intended to come into contact with the water are coated with a thin film of protective material, in particular Teflon, which prevents direct contact between the water and the aluminium.

One object of the present invention is to provide an electric heating device of the type initially defined which is improved in such a way that it has both a compact size and a significantly improved energy efficiency.

This object, together with other objects, is achieved according to the invention with an electric heating device of the type initially defined, characterized in that the aforementioned assembly made of heat-conducting material comprises:

- a central body having two main opposite surfaces or faces to which respective closing shells or covers are connected in a liquid-tight manner;
- between each main surface or face of the central body and the associated closing shell or cover there being defined a respective passage which follows a serpentine or labyrinth-like path; said serpentine or labyrinth-like passages communicating with each other by means of a through-hole provided between said main surfaces or faces of the central body;
- the aforementioned heating resistor being provided in the central body, between said main surfaces or faces, such that it is operationally in a heat-exchanging relationship with both the aforementioned serpentine or labyrinth-like passages.

Further characteristic features and advantages of the invention will become clear from the following detailed description provided purely by way of a non-limiting example, with reference to the accompanying drawings in which.

Figure 1:
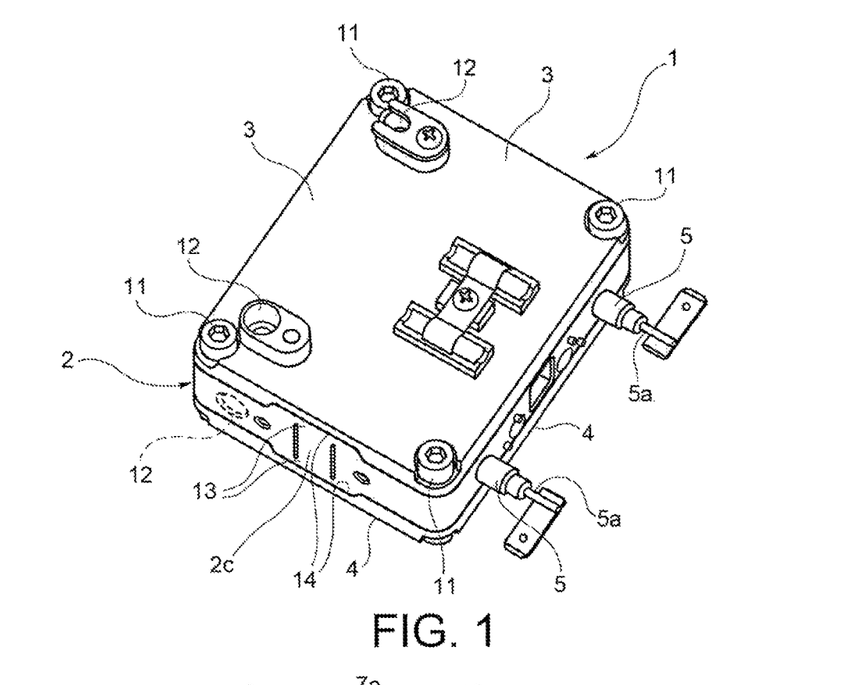
FIG. 1 is a perspective view of an electric heating device according to the present invention.

In FIG. 1, 1 denotes in its entirety an electric heating device according to the present invention, for the production of hot water and/or steam.

This heating device 1 comprises a central body 2 which in the embodiment shown by way of example has a general substantially parallelepiped shape.

Figure 2:
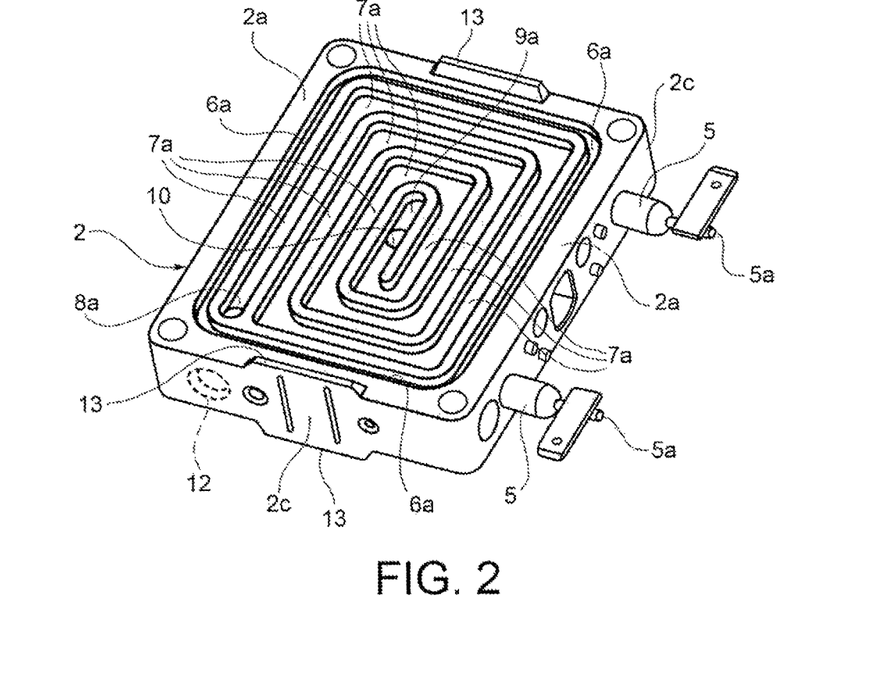
FIG. 2 is a perspective view of the central body of the device according to FIG. 1.
Figure 3:
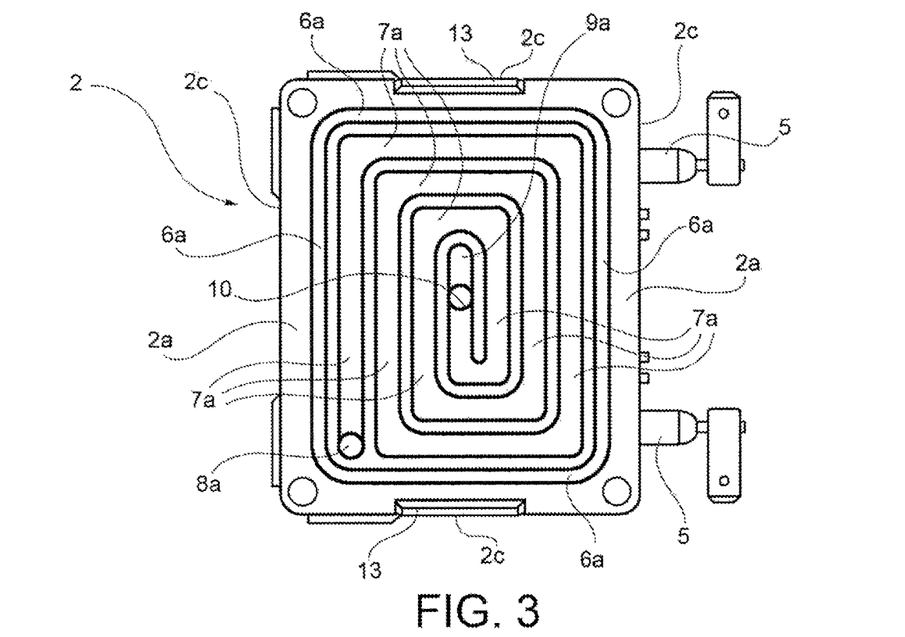
FIGS. 3 and 4 are a top plan view and bottom view, respectively, of the central body shown in FIG. 2.
Figure 4:
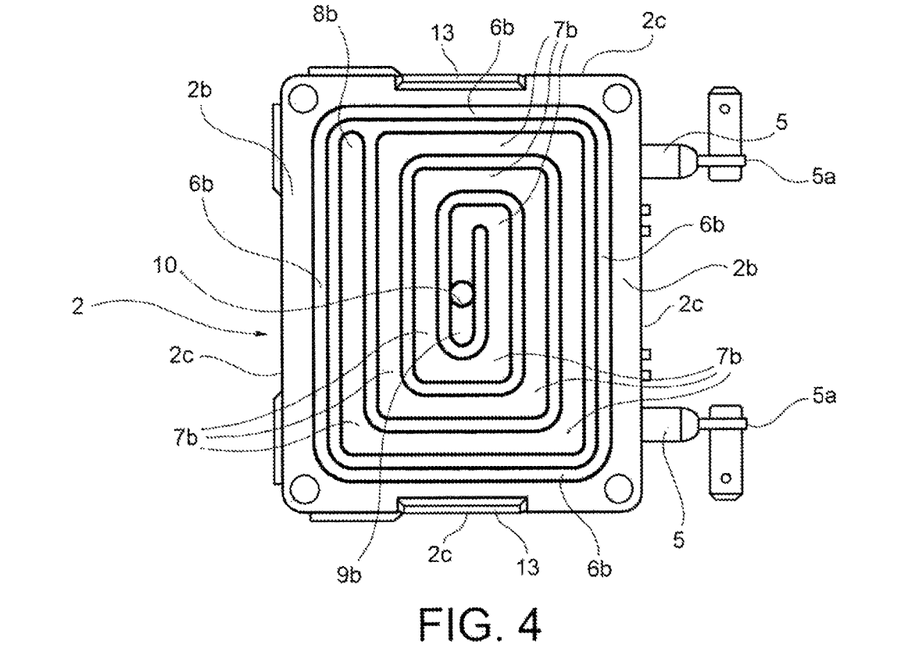

As can be seen in FIGS. 2 to 4, the central body 2 has two main opposite surfaces or faces 2a and 2b and a lateral surface 2c.

Respective closing shells or covers—denoted by 3 and 4—which are preferably identical to each other are applied and connected in a liquid-tight manner to the main surface or faces 2a, 2b of the central body 2.

The central body 2 and the associated closing shells or covers 3 and 4 may be conveniently made of die-cast metallic material, in particular aluminium or an alloy thereof.

A heating resistor 5 is incorporated in the main body 2 (see for example FIG. 5), its terminals or connecting lugs 5a emerging from this central body 2, preferably along a same side thereof, as shown in the drawings.

Figure 5:
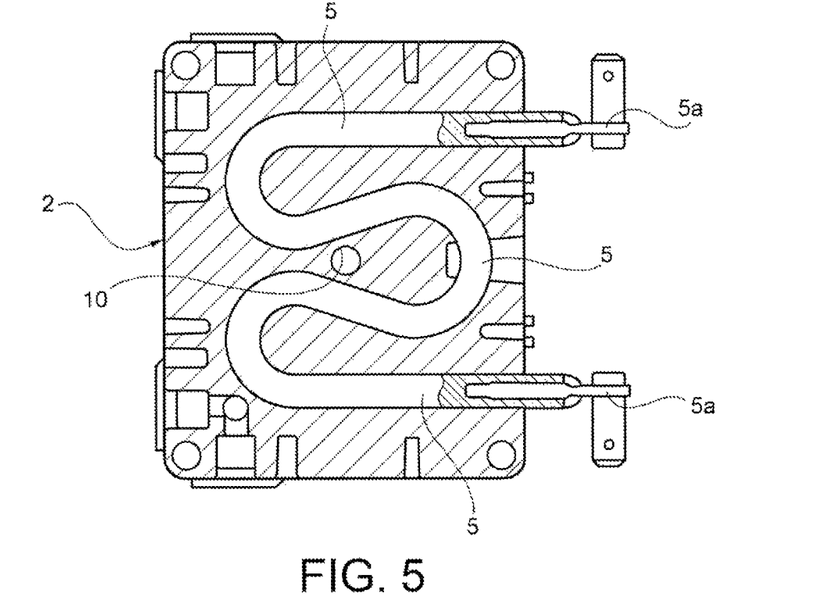
FIG. 5 is a cross-sectional view of the central body according to FIGS. 2 to 4.
Figure 6:
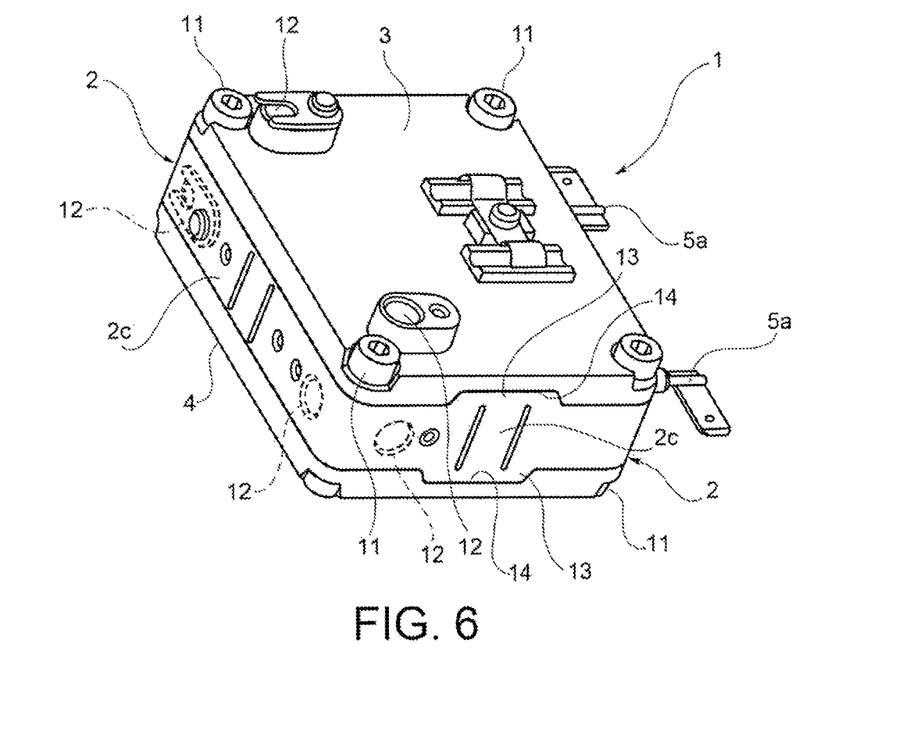
FIG. 6 is another perspective view of the heating device according to FIG. 1.

This resistor 5 extends in an intermediate plane of the central body 2, between its main surfaces or faces 2a and 2b.

In the embodiment shown each of said main surfaces or faces 2a, 2b of the central body 2 has, formed therein, a respective external perimetral groove 6a, 6b for seating a corresponding sealing ring.

A respective groove 7a, 7b is formed on the inside of the respective perimetral groove 6a, 6b in each main face 2a, 2b of the central body 2 (see FIGS. 2 to 4).

In the embodiment shown the grooves 7a and 7b form labyrinth-like paths, essentially in the form of spirals with rectangular turns which extend between a respective outer end 8a, 8b and a respective inner end 9a, 9b.

The labyrinth-like grooves 7a, 7b formed in the two main faces of the central body 2 communicate with each other via a through-hole 10 formed between the main faces 2a, 2b of said body 2.

The grooves 7a, 7b of the central body 2, instead of following a labyrinth-like path, could have a serpentine progression.

Said grooves 7a, 7b have a channel-like section and, in the embodiment shown, their cross-section is closed in a liquid-tight manner by means of clamping of the covers 3, 4 on the central body 2.

In an alternative embodiment, not shown in the drawings, the grooves 7a and 7b may be formed, at least partly, in the inner main surfaces or faces of the closing shells or covers 3, 4. In this case also, these grooves communicate with each other via a through-hole provided in the central body 2.

In the embodiment shown in FIGS. 1 to 8, the closing shells or covers 3 and 4 are clamped on the central body 2 by means of bolts 11 or the like which pass through corresponding through-holes provided in said shells or covers 3, 4 and in the central body 2.

Conveniently, the inner surface or face of each shell or cover 3, 4 which is intended to be applied in a liquid-tight manner against a corresponding main surface or face 2a, 2b of the central body 2 has a convex shape. Owing to this feature, a reliable liquid-tight sealing action is ensured, also in the case where the heating device 1 operates at high pressures which may tend to cause flexing of the end shells or covers 3, 4.

A particular feature of the heating device 1 according to the invention consists in the possibility of positioning inlet and outlet openings or orifices for the water/steam in a vast range of possible locations.

Figure 7:
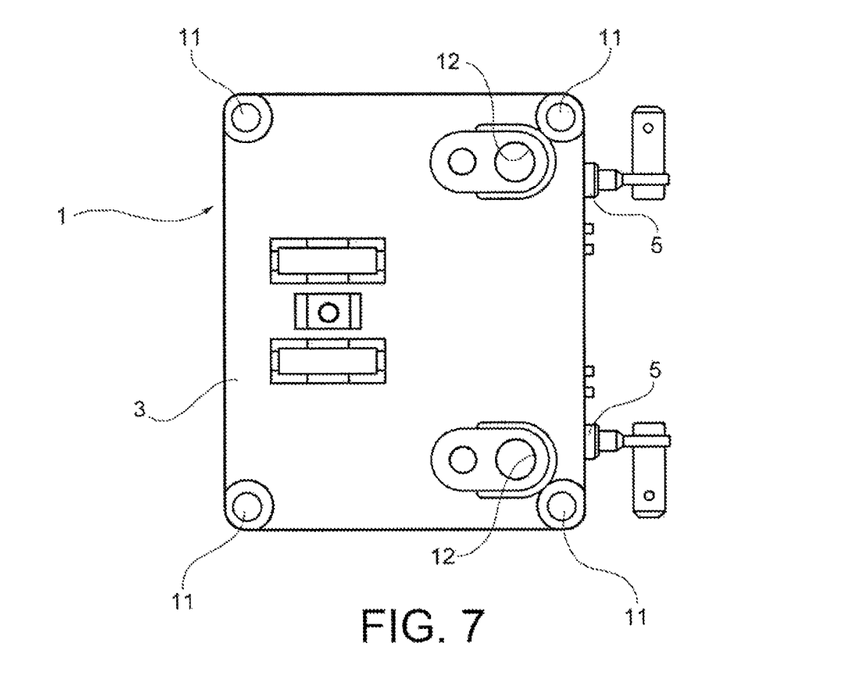
FIG. 7 is a top plan view of a variation of embodiment.

With reference to FIGS. 1 and 7, these openings or orifices, which are denoted by 12, may be formed for example in the shells or covers 3, 4. One or both these orifices may be provided by way of an alternative in the lateral surface 2c of the central body 2, for example in the locations which are shown in broken lines in FIGS. 1, 6, 9 and 10, where these orifices have again been indicated by 12.

The wide range of possibilities for location of the inlet/outlet orifices simplifies considerably the choice as to the position and orientation of the heating device 1 depending on the specific conditions of use.

Conveniently the surfaces of the central body 2 and the shells or covers 3, 4 intended to make contact with the water/steam are provided with a protective coating consisting of ceramic material. This prevents the formation of harmful substances due to oxidisation.

Conveniently, on each main surface or face 2a, 2b the central body 2 has at least one positioning and centring formation 13 (see for example FIGS. 1, 2 and 6) cooperating with a corresponding complementary formation 14 of the associated closing shell or cover 3, 4.

Figure 8:
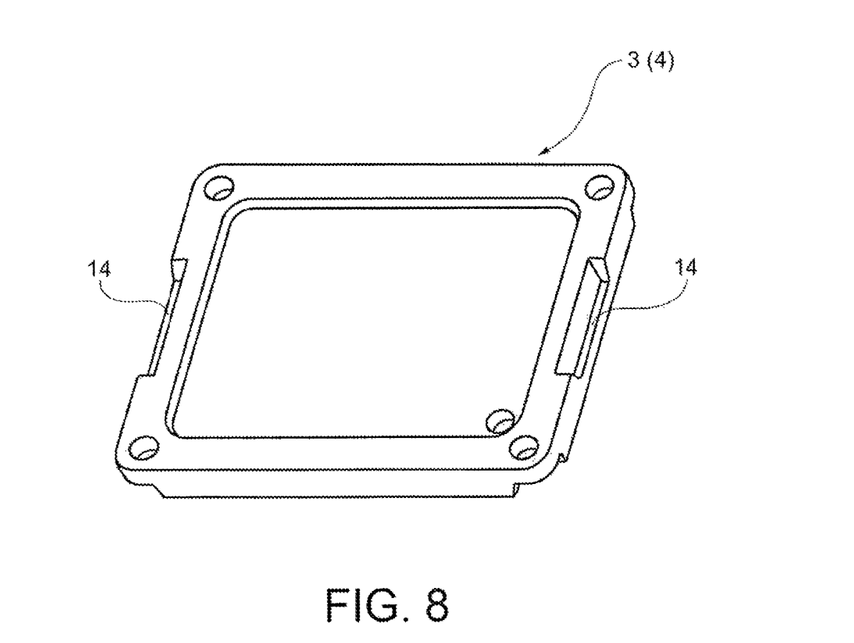
FIG. 8 is a perspective view of a closing shell or cover.

In the embodiment shown the positioning and centring formations 13 consist of projections provided on the smaller sides of the central body 2, and the cooperating formations 14 of the associated shells or covers 3, 4 are recesses with a complementary shape (see for example FIG. 8).

Figure 9:
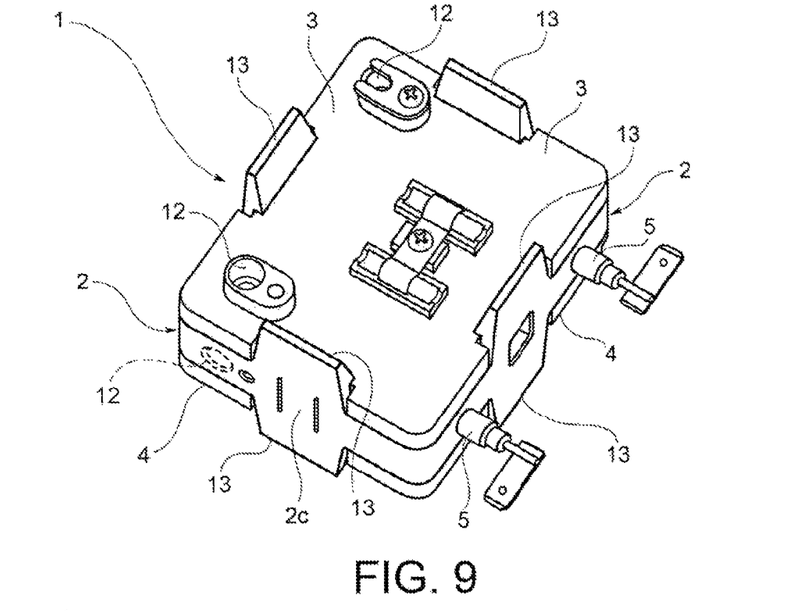
FIGS. 9 and 10 are two perspective views of a variation of embodiment.
Figure 10:
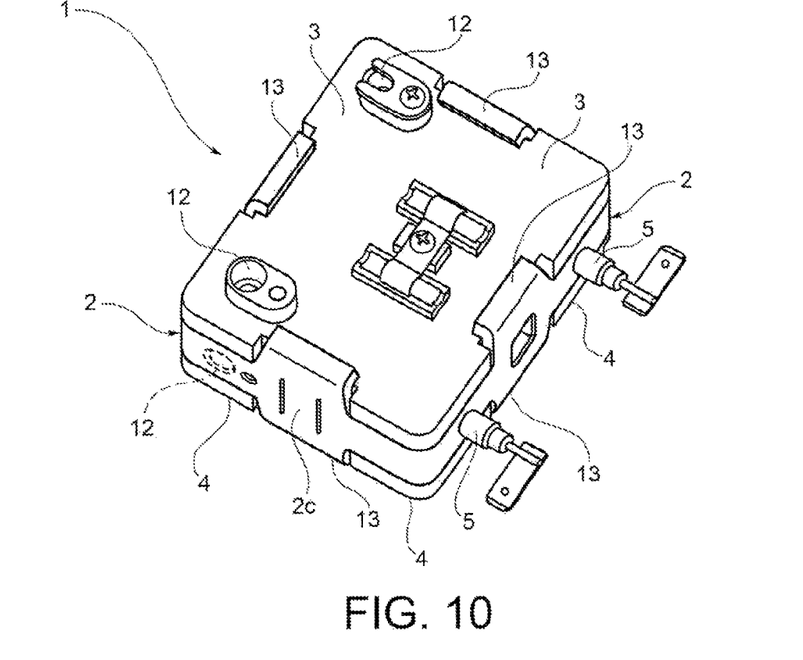

FIGS. 9 and 10 show a variation of embodiment in which the sealed clamping of the shells or covers 3, 4 on the central body is performed by means of at least two, and for example four positioning and centring formations 13. In the embodiment shown in these figures the formations 13 extend beyond the thickness of the shells or covers 3, 4 inside the corresponding lateral incisions 14 provided in the latter. After relative positioning in the condition shown in FIG. 9, the portions of the formations 13 which project beyond the associated shells or covers 3, 4 are upset, or otherwise plastically deformed, onto these shells or covers 3, 4, as can be seen in FIG. 10, so as to clamp and fasten the latter against the central body 2.

In the solution shown in FIGS. 9 and 10 it is therefore possible to dispense with the clamping bolts 11 described above.

Figure 11:
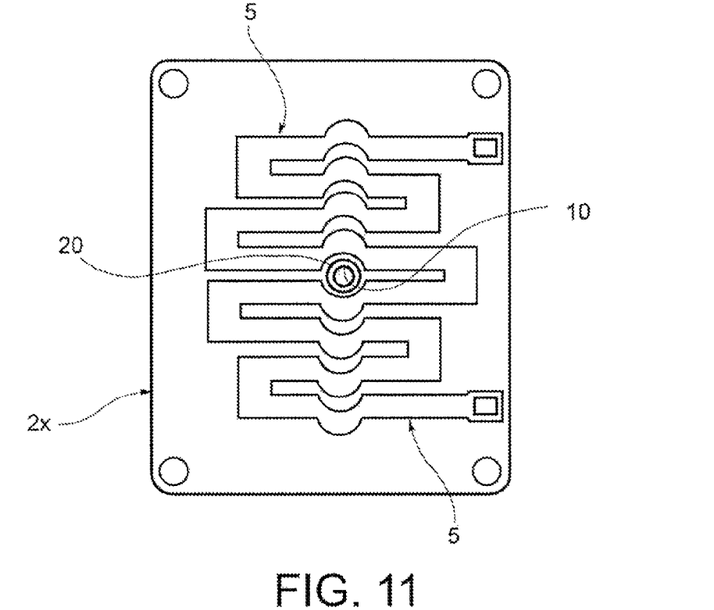
FIGS. 11 and 12 are cross-sectional views similar to that shown in FIG. 5 and show two variations of embodiment of the heating resistor.
Figure 12:
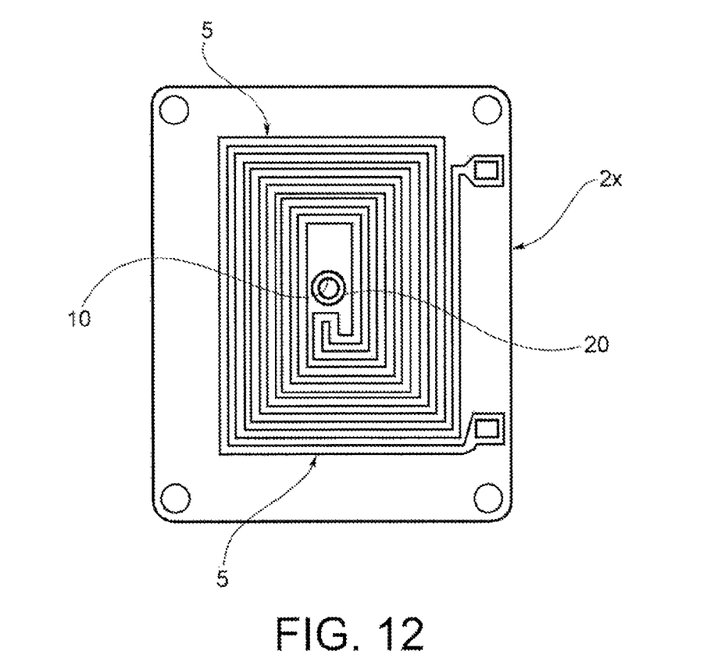

FIGS. 11 and 12 show variations of embodiment in which the central body 2 is formed as two layers or superimposed parts, one of which is denoted by 2x in these figures. The part 2x, on its face facing the other part of the central body 2, is provided with the heating resistor 5 which is formed as an essentially flat resistor silkscreen-printed onto said face, following a serpentine path in the case of FIG. 11 and with a double-spiral labyrinth-like progression in the case of FIG. 12. The two parts of the central body 2 have respective holes 10 which are aligned with each other so as to allow communication between the grooves 7a and 7b described above. Along the passage between said two parts of the central body the seal around the respective hole 10 is ensured by means of a sealing ring 20 which is seated inside a corresponding seat provided in one of said two parts of the central body or is provided partially in both of them.

In the variants shown in FIGS. 11 and 12, the connection of the resistor 5 to the external power supply circuit may be performed by means of welding or insulated terminals with a spring contact.

With the solutions shown in FIGS. 11 and 12 it is possible to reduce substantially the thickness of the heating resistor 5 and therefore improve the heat exchange with the paths defined by the grooves 7a, 7b of the central body 2 and by the associated closing shells or covers 3, 4.

In all the variations of embodiment described above and in those further variations which persons skilled in the art may easily formulate on the basis of the teachings according to the present invention, the provision of serpentine or labyrinth-like paths on both the main surfaces or faces of the central body 2 allows the heat produced by the heating resistor to be used more efficiently, resulting in fact in a substantial halving of the heat dissipation which otherwise would occur in the case of a single serpentine or labyrinth-like passage.

The electric heating device according to the invention is moreover extremely compact and distinguished by a particular versatility with regards to the connection or arrangement thereof.

Obviously, without affecting the principle of the invention, the embodiments and the constructional details may be significantly modified with respect to that described and illustrated purely by way of a non-limiting example, without thereby departing from the scope of the invention as defined in the accompanying claims.

The invention claimed is:

1. Electric heating device (1) for the production of hot water and/or steam, comprising:
    an assembly (2-4) which is made of a heat-conducting material and has at least one associated heating resistor (5) and in which, between inlet and outlet orifices (12), there is defined a passage (7a, 7b) which follows a predetermined path, close to said resistor (5), for a flow of water intended to be heated and/or converted at least in part into steam;
    wherein said assembly (2-4) comprises:
    a central body (2) having two main opposite surfaces (2a, 2b) to which respective closing shells (3, 4) are connected in a liquid-tight manner;
    between each main surface (2a, 2b) of the central body (2) and the associated shell (3, 4) there being defined a respective passages which follows serpentine paths (7a, 7b);
    said serpentine paths (7a, 7b) communicating with each other by means of a through-hole (10) provided between said main surfaces (2a, 2b) of the central body (2);
    said heating resistor (5) being provided in the central body (2), between said main surfaces (2a, 2b), such that it is in a heat-exchanging relationship with both said serpentine paths (7a, 7b); and
    wherein the surface of each shell (3, 4) to be applied in a liquid-tight manner against a corresponding main surface (2a, 2b) of the central body (2) has a convex profile.

2. Heating device according to claim 1, wherein each of said serpentine paths (7a, 7b) comprises a groove (7a, 7b)

with a channel-like cross-section provided in a main surface or face (2a, 2b) of the central body (2), said cross-section being transversely closed in a liquid-tight manner by a portion of the associated shell (3, 4).

3. Heating device according to claim 1, wherein said inlet and outlet orifices (12) are provided in the lateral surface (2c) of the central body (2).

4. Heating device according to claim 1, wherein at least one of said inlet and outlet orifices (12) is provided in the aforementioned closing shells or covers (3, 4).

5. Heating device according to claim 1, wherein the central body (2) and said shells (3, 4) are made of metallic material including aluminium or alloys thereof, and their surfaces configured to come into contact with water are provided with a coating including a ceramic material.

6. Heating device according to claim 1, wherein on each main surface or face (2a, 2b) the central body (2) has at least one positioning and centring formation (13) cooperating with a corresponding formation (14) of the associated closing shell (3, 4).

7. Heating device according to claim 6, wherein the positioning and centring formations (13) of the central body (2) are plastically deformed onto the corresponding closing shells (3, 4) such as to clamp and fasten said shells (3, 4) against the central body (2).

8. Heating device according to claim 1, wherein the central body (2) comprises two superimposed parts, and the heating resistor (5) is a resistor comprising a silkscreen-printed resistive material, following a serpentine, on one face of one part (2x) of the central body (2) facing the other part of said central body (2).

\* \* \* \* \*